United States Patent [19]

Bechara et al.

[11] 4,115,634

[45] Sep. 19, 1978

[54] AMINE SALTS OF AMINO ACIDS AS DELAYED ACTION CATALYSTS

[75] Inventors: Ibrahim S. Bechara, Boothwyn; Rocco L. Mascioli, Media; Philip J. Zaluska, Glen Riddle, all of Pa.

[73] Assignee: Air Products & Chemicals, Inc., Allentown, Pa.

[21] Appl. No.: 746,312

[22] Filed: Dec. 1, 1976

[51] Int. Cl.$^2$ ............................................. C08G 18/18
[52] U.S. Cl. ................................... 521/126; 521/124; 521/127; 528/52; 528/53
[58] Field of Search ................ 260/2.5 AC, 77.5 AC, 260/75 NC

[56] References Cited

U.S. PATENT DOCUMENTS

| | | | |
|---|---|---|---|
| 2,866,762 | 12/1958 | Brochhagen | 260/77.5 AC |
| 2,921,915 | 1/1960 | Brochhagen | 260/77.5 AC |
| 3,164,557 | 1/1965 | Merten | 260/2.5 AB |
| 3,222,303 | 12/1965 | Hampson | 260/2.5 AC |
| 3,239,480 | 3/1966 | Windemuth | 260/77.5 AC |
| 3,620,985 | 11/1971 | Larkin | 252/431 C |
| 3,862,150 | 1/1975 | Bechara | 260/77.5 AC |
| 3,954,684 | 5/1976 | Farrissey | 260/2.5 AC |
| 3,988,268 | 10/1976 | Dietrich | 260/2.5 AM |
| 4,026,836 | 5/1977 | Zimmerman | 260/2.5 AC |
| 4,040,992 | 8/1977 | Bechara | 260/2.5 AC |

FOREIGN PATENT DOCUMENTS 651,638  11/1962  Canada.
732,648   4/1966  Canada.

Primary Examiner—C. Warren Ivy
Attorney, Agent, or Firm—Russel L. Brewer; Barry Moyerman

[57] ABSTRACT

The amine salts of amino acid compositions have been found to be effective as a delayed action catalyst for organometallic catalyzed urethane synthesis. The acid which provides the basis for the salts is characterized generally by reacting an amine with an unsaturated acid, or with formaldehyde and hydrogen cyanide followed by hydrolysis of the resulting nitrile.

28 Claims, No Drawings

AMINE SALTS OF AMINO ACIDS AS DELAYED ACTION CATALYSTS

BACKGROUND OF THE INVENTION

Polyurethanes, which are formed by reacting an isocyanate with a reactive hydrogen providing component, such as a polyol, have been widely used in preparing rigid and flexible foams, castings, adhesives and coatings. Typically, the reaction between the isocyanate and the polyol has been catalyzed by using various components such as amines, e.g. tertiary amines, and organometallics, particularly organo tin compounds such as stannous octoate, dibutyl tin laurate, tin ethylhexanoate and so forth. The effectiveness of the catalyst is often measured by the cream time, which is the time required for the isocyanate and polyol syrup to turn from a clear solution to a creamy color; the gel time, which is the time required for polymer particles to form in the syrup; rise time, which is the time required for the syrup to rise to its maximum height; and cure time which is the time to reach a tack-free state.

In some applications for polyurethanes it is desirable to effect reaction in the shortest time possible and, therefore, catalysts having tremendous activity are desired. In some applications, though, as in the molding of intricate parts or large objects, it may be desirable to keep the polyurethane composition in a fluid state for an extended time to permit the composition to completely fill the mold or flow into the cracks and crevices of the mold. Then, once the mold is completely filled, it is desirable to effect polymerization of the polyurethane in the shortest time possible so that the finished parts can be removed and the mold recharged with new materials. In this regard, it is desirable to delay the initial reaction, but after reaction commences then catalyze the polymerization rate. To do this it is necessary to extend the cream time to permit the polyurethane composition to penetrate the cracks and crevices in the mold and to extend the gelation time as the polyurethane foam on gelling becomes intractable and resists molding. However, once the reaction begins, it is desirable to end up with a rise and cure time comparable to those achieved by active catalysts as this will permit greater productivity.

DESCRIPTION OF THE PRIOR ART

Orgnometallics and particularly organo tin compounds such as tin ethylhexanoate, tin isooctoate, tin naphthenate, di-n-butyl tin dilaurate; dibutyl tin diacetate, and tertiary nitrogen tin compounds such as dibutyl-tin-di(pyridine-4-carboxylic acid esters) as shown in U.S. Pat. Nos. 3,595,734 and 3,164,557 have been used to catalyze urethane reactions.

Amine compounds and particularly tertiary amines or their salts have been used as catalysts for polyurethanes. Examples of amines which are suited for catalyzing polyurethane reactions are dimethyl benzylamine, triethylenediamine, trimethylamine; alkanolamines such as diethanolamine, triethanolamine, N-diethylethanolamine; N-hydroxyalkyl substituted imidazoles and N-vinyl pyrrolidone as shown in U.S. Pat. Nos. 3,645,927; 3,450,648; 3,448,065 and 3,746,663.

More recently beta-amino carbonyl catalysts and beta-amino nitriles as described in U.S. Pat. Nos. 3,821,131 and 3,925,268 have been shown as effective catalysts for preparing polyurethanes. Examples of beta-amino carbonyl catalysts include dialkylamino esters such as methyl 3-(N, N-dimethyl amino) propionate and the heterocyclic beta-amino acids such as 3-(N-morpholino)-2-methyl-N'N'-dimetyl amino proprionitrile, 1,4-piperizine diproprionitrile, and N-ethyl-N-(2-cyanoethyl) amine. These catalysts also have an advantage in that the resulting product does not have the characteristic amine odor.

U.S. Pat. Nos. 3,620,986 and 3,580,868 show that Mannich bases of secondary amines and phenols can be used for catalyzing an isocyanate-hydroxyl reaction. Generally, some aminoalcohol is present and the phenol radical may contain an active hydrogen atom, e.g. COOH, CONH$_2$, OH, etc., which can condense into the urethane structure. Typically, these Mannich bases are formed by reacting dimethylamine, formaldehyde and a phenol, e.g. Bisphenol A, or salicyclic acid amide.

Although the above references indicate the compositions have catalytic activity, a number of references have suggested similar but different compositions as being useful as delayed action catalysts (DAC), i.e. those which initially delay and then catalyze the isocyanate-hydroxyl reaction. For example, chelating agents, e.g. beta-diketones and beta carbonyls with amine-free organometallics have been used. Examples of beta-diketones useful as a delayed action catalyst in polyurethane chemistry include 2,4-hexanedione, acetylacetone, 1-cyclohexyl-1,3-butanedione; beta-hydroxy ketones, e.g. beta hydroxy quinoline, 1-hydroxy-9-fluorenone, and alpha-hydroxy ketones, e.g. benzoin, acetoin and others as shown in U.S. Pat. No. 3,635,906.

Other examples of delayed action catalysts for the preparation of foamed polyurethane resins are shown in U.S. Pat. No. 2,932,621 and Canadian Pat. No. 651,638. This (621) patent discloses that amine salts of dicarboxylic acids and notably the hydroxy tertiary amine salts of oxalic acid are particularly effective in delaying the initial reaction between an isocyanate and hydroxyl group, but after an appropriate lapse of time, they become fully effective and cause the reaction to proceed to completion smoothly, rapidly and efficiently. The (638) patent discloses that tertiary amine salts of carboxylic acids, e.g. acetic, formic, iminotriacetic and ethylenediaminetriacetic acid are thermally sensitive delayed action catalysts.

It has also been proposed to use quaternary ammonium salts of Mannich bases as a delayed action catalyst for the reaction between isocyanate and polyol to form polyurethanes. Generally, the quaternary ammoniium salt has little catalytic effect, but during the reaction it decomposes to form tertiary amine which can assist in catalyzing the reaction. Examples of quaternary ammonium salts of Mannich bases are shown in U.S. Pat. No. 2,950,262 and are prepared by reacting a secondary amine with an aldehyde and a ketone such as cyclohexanone and then reacting the Mannich base with an organic halide to form the quaternary ammonium salt. This catalyst is not particularly effective as a delayed action catalyst when used in conjunction with organometallics.

It has also been proposed to sorb conventional polyurethane catalysts such as tertiary amines or organometallics onto an organic support having a density of from about 0.01 to about 0.6 g/cm$^3$ in order to delay their activity. Examples of organic supports which are used in forming the delayed action catalysts are polymethyl methacrylate, polystyrene, polyvinyl acetate, polyvinyl chloride, and copolymers thereof. Further examples are set forth in U.S. Pat. 3,136,731.

Some of the problems with delay action catalysts (DAC) in the past is that not only do they delay cream time and gelation time, but also they delay the rise and cure time. As a result, these DAC's result in lower production rates.

SUMMARY OF THE INVENTION

This invention relates to polyurethane compositions containing an effective proportion of a catalyst comprising an amine salt of an amino acid and an organometallic catalyst and a method for catalyzing the reaction between an isocyanate and a compound having a reactive hydrogen atom as determined by the Zerewitinoff method.

The amine salt of an amino acid, which is the main component of the novel catalyst for initiating the urethane reaction, is represented by the formulas

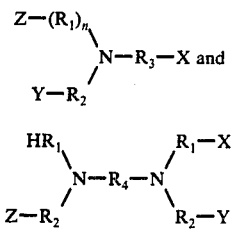

wherein $R_1$, $R_2$ and $R_3$ independently are alkylene groups having from 1 to 15 carbon atoms, cyclic and alkyl substituted cycloalkane radicals with the alkyl portion having from 1 to 6 carbon atoms, aryl groups, and aralkyl groups with the alkyl portion having from 1 to 6 carbon atoms, and substituted groups thereof;

$R_4$ is an alkylene radical having from 1 to 4 carbon atoms, or an imino alkylene having from 4 to 10 carbon atoms;

H is hydrogen;

X is a amine salt of a carboxylic acid group;

Y is a hydrogen atom, a hydroxyl group, a carboxylic acid group, a nitrile group, or an amine salt of a carboxylic acid group;

Z is a hydrogen atom, a hydroxyl group, a carboxylic acid group, a nitrile group, or an amine salt of a carboxylic acid group;

n is 0 or 1.

Advantages of the catalysts of this invention include:

a catalyst having the ability to delay the initial reaction between an isocyanate and an active hydrogen containing compound, catalyzed by an organometallic;

the ability to form a polyurethane molding composition having excellent flow during initial reacton by extending the cream and gelation time and yet end up with a desirable rise and cure time which often is comparable to those obtained with conventional catalyst compositions; and the ability to form polyurethane compositions which are substantially free of the characteristic amine odor found heretofore;

DESCRIPTION OF THE PREFERRED EMBODIMENTS

Broadly, the amine salts of amino acids (DAC's) of this invention can be visualized as having at least monofunctionality in terms of amine, and at least monofunctionality and preferably difunctionality in terms of the amine salts. Some of these compounds can be formed by reacting ammonia, a primary or secondary amine with an olefinic unsaturated compound having sufficient reactivity to replace the amine hydrogen atom. This is known in the art as a Michael's reaction. Further, the olefinic compound must have pendent acid functionality or functionality which can be subsequently converted to the acid and then to the amine salt. Other amine salts of amino acids can be formed generally by first reacting primary or secondary amines with formaldehyde and HCN to form a nitrile. The nitrile can then be converted to the acid, which then can be connected to the amine salt. The catalysts can be formed by reacting the amines with a halogenated organic acid, e.g. haloalkyl or haloaryl acid, and then converting the acid to the amine salt.

Amines, including ammonia, are used in forming the amine salts of amino acid catalyst component of this invention. Preferably, a primary amine is used in the reaction as it permits the formation of a disubstituted amino acid, i.e. a monofunctional amine having two acid groups which then can be converted to the ammonium salt. Generally, the amines are lower alkyl amines having from 1 to 15 carbon atoms, and preferably 1 to 3 carbon atoms, lower alkanolamines where the alkanol portion has from 2 to 4 carbon atoms; phenyl amines such as mono and dibenzylamine, cyclic amines such as cyclohexylamine and dicyclohexylamine; aralkyl amines, e.g. ethylbenzylamines and so forth. The amines can be substituted with various functional groups so long as the functionality does not interfere with the reaction or impart an adverse characteristic to the resulting polyurethane resin. The preferred substituted group is a hydroxyl group as it does not interfere with the reaction and tends to aid in the delay of the initial urethane reaction and thereby lengthen the cream time. Examples of primary and secondary amines suited for forming the tertiary amino acids of this invention include methylamine, ethylamine, propylamine, dimethylamine, diethylamine, dipropylamine, diethanolamine, dipropanolamine, cyclohexylamine, dicyclohexylamine, benzylamine, dibenzylamine, etc.

In preparing the amino acid salts represented by formula II, diamines are used in place of the primary and secondary amines and such diamines include ethylenediamine, propylenediamine, diethylenetriamines, and triethylenetetraamines. The substitutent groups pendent from the nitrogen atoms can be varied in exactly the same manner as the primary and secondary amines used in forming the formula I amine salts of amino acids.

One of the easiest ways to introduce acid functionality into the amine for conversion to the ammonium salt is through the well-known Michael's reaction. In this reaction, an olefinic reactant, having sufficient reactivity at the olefinic site is used to displace the amine hydrogen atom. Generally, a Michael's reaction implies carbonyl functionality in conjugated relationship to the olefin bond, but for purposes herein, all that is required is that the olefinic bond be sufficiently reactive to displace the amine hydrogen. To form the amine functionality as is required in the amine salts of the amino acid catalysts of this invention, the olefinic reactant should contain an acid group or contain a functional group which can be subsequently converted to the acid, e.g. a nitrile, ester, ketone, etc. Further, the functional groups should not adversely affect the reaction used for forming the catalyst composition. Examples of olefinic compositions which can be used in forming the Michael's type adducts include: acrylic acid, methacrylic acid, allylic acid and disubstituted acids such as maleic acid, fumaric acid, citraconic acid, itaconic acid, and so forth. Other olefinic reactants which can be used to form the Michael's adduct generally have substituted groups which can subsequently be converted to the acid. Examples of substituted olefinic reactants include acrylonitrile, in which the nitrile can be hydrolized to the acid; ketones, such as methyl vinyl ketone; esters such as methylacrylate, methylmethacrylate, ethylacrylate, 2-ethylhexylacrylate, vinyl butyrate, allyl acetate, and the like. Like the nitrile, the aldehyde, ketone and ester groups can be converted to the acid form and then to the amine salt by conventional techniques.

A second method for forming the amine salts of amino acids of this invention is to react the primary or secondary amine with an aldehyde such as formaldehyde, and then react this reaction product with HCN to form the nitrile. The nitrile then can be hydrolyzed in a conventional manner to the acid. In this reaction, it is necessary to form a terminal methylol group by the reaction of the aldehyde with the amine, and any aldehyde performing this function is operable. This reaction can be performed in one or two steps as described. Examples of aldehydes suited for this reaction include furfuraldehyde, benzaldehyde, acetaldehyde and formaldehyde. As mentioned before, then the resulting reaction product is reacted with HCN and subsequently converted to the acid.

A third method of forming the amine salts of amino acids of this invention is by reacting the amine or ammonia with an active halogenated organic acid, e.g. by usng chloroacetic, or chloroproprionic acid, or with a halogenated compound having functionality convertible to the acid, e.g. chloroacetonitrile, chloroproprionitrile, 4-chlorobutanone, etc. In this instance though, the halogen group reacts to displace the amine hydrogen atom rather than the olefinic bond as is observed in a Michael's reaction. One of the problems with this technique is the disposal of the corrosive by-product halogen acid. For these reasons, a Michael's type reaction using olefinic reactants is preferred because the end result is essentially the same.

Of the above listed amines, olefinic reactants and aldehydes being suited for forming the amine salts of amino acids of this invention, some are easier to use than others, or alternatively, some are more difficult to react and form the amine salts of the amino acids of this invention. What is intended by this listing is to show that a variety of amines, olefinic compositions and aldehydes can be used to form an amino acid having desired tertiary amine functionality and desired acid functionality for subsequent conversion to the ammonium salt to impart delayed catalytic activity to an organometallic catalyzed urethane reaction.

The amine salts are intended by definition herein to include all amine salts and quaternary ammonium salts, and can be formed by reacting the amino acids with amines to form the delayed action catalyst component. In some cases where the amine functionality is imparted from normally active tertiary amines that tertiary amine may detract from the delayed action of the catalyst as opposed to a similar catalyst where the amine salt functionality is based on primary or secondary amines. This is because the increased tertiary amine content, which results on thermal decomposition of the amine salt generally enhances the catalytic activity to reduce the cream time. Although cream times less than the cream time for an organometallic - amine salt of an amino acid catalyzed polyurethane may be observed when the teratiary amine is highly reactive, e.g. triethylenediamine, the cream time is substantially longer than if the amino acid for forming the salt was not present, and only the highly reactive tertiary amine and the organometallic were present. For example, a tertiary anine-organometallic catalyzed reaction will have a much shorter cream time than the same urethane composition catalyzed with similar quantities of amine and organometallic, but including an amino acid. Thus, the amino acid as an amine salt of an amino acid is a useful way of introducing additional tertiary amine, particularly highly reactive ones without sacrificing cream time.

Amine salts of the amino acids can be formed by reacting the amino acids with amines such as ethanolamine, diethanolamine, triethanolamine, tripropanolamine, propylamine, triethylamine, cyclohexylamine, dimethylbenzylamine, N-ethyl morpholine, dimethylethylamine, etc. Highly reactive tertiary amines such as triethylenediamine can also be used to form quaternary ammonium salts of the tertiary amino acid and these catalysts are particularly effective for catalyzing the urethane reaction. Generally, the less active amines, such as ethanol and diethanol amine result in producing a less active catalyst. Mixed quaternary ammonium and amine salts of amino acids can also be made and advantageously used as cocatalysts with the organometallic compounds.

Examples of amino acids suited for conversion to the amine salt and examples of amine salts of amino acids of this invention then include: hydroxyethyl-ethylenediamine triacetic acid, hydroxyethyliminodiacetic acid; hydroxyethylaminoproprionic acid, N-2-hydroxypropyliminodiacetic acid; iminodiacetic acid; bis-N-tripropylamine salt of hydroxyethyliminodiproprionic acid; 2(2'-hydroxyethoxy) ethyliminodiacetic acid, bis-diethanolamine salt of hydroxyethyliminodiacetic acid; bis-triethylenediamine salt of hydroxyethyliminodiacetic acid, hydroxyethylimino-2,2-dipropionic acid, bis-hydroxyethylaminoacetic acid, hydroxyethyl cyanoethyl acetic acid, N-methyl amino diacetic acid, nitrilotriacetic acid, tris-monoethanolamine salt of nitrilotriacetic acid, the N-methyl diethanolamine and tri-n-propylamine salt of hydroxyethyliminodiacetic acid and so forth.

The second component used in combination with the amino salt of an amino acid for forming the urethane catalyst of this invention is an organometallic. Typically, these organometallics have the formula $R_nM$ wherein R designates the organo moiety, M represents the metallic moiety and $n$ is an integer sufficient to satisfy the valence of the metal component. Generally, the metals in the organometallic include antimony, tin, lead, manganese, mercury, cobalt, nickel, iron, vanadium and copper. From a commercial point of view, only a few of these metals are used in polyurethane synthesis as they have advantages of cost and they do not substantially affect product quality. For example, iron, although it is effective for catalyzing the isocyanatehydroxyl reaction, may cause discoloration. Of the metals listed, tin is probably the metal that is used in greatest proportion, and it is preferred in practicing this invention.

The organo portion of the organometallic component is present to provide solubility of the metal in the isocyanate-polyol syrup. The solubility of the organometallic should be at least about 1 gram per 100 grams of syrup at 50° C and organo portions which provide that solubility are operable. Generally, the organo portion is an aliphatic having from 6–15 carbon atoms or an alkoxy group, although cyclic and cycloaliphatic groups can be used. Examples of organometallics used for practicing this invention include dibutyl tin dilaurate, dibutyl tin diacetate, diethyl tin diacetate, dihexyl tin diacetate, dibutyl tin-di(2 ethyl hexanoate) stannous octoate, tin decanoate, di-N-octyl tin mercaptide, ferrous and ferric acetates, dioctyl tin oxide, dibutyl tin oxide, titanium acetyl acetonate, and so forth. Other examples are set forth in numerous U.S. Pat. Nos., e.g. 3,595,734; 3,164,557 and 3,925,268 and are incorporated bu reference.

Any polyisocyanate used in urethane synthesis can be used here. Representative polyisocyanates suited for producing polyurethanes in practicing this invention are the aliphatic and aromatic polyvalent isocyanates. Examples of aliphatic isocyanates include alkylene diisocyanates such as tri, tetra and hexamethylene diisocyanates; arylene diisocyanates and their alkylation products such as phenylene diisocyanate, naphthylene diisocyanate, diphenylmethane diisocyanate, toluene diisocyanate, di and triisopropyl benzene diisocyanate and triphenylmethane triisocyanates; triesters of isocyanato-phenyl-thiophosphoric acid; triesters of para-isocyanato phenyl phosphoric acid; aralkyl diisocyanates such as 1-(isocyanato phenol-ethyl) isocyanate or xylene diisocyanate.

Any polyol used in urethane synthesis can be used here. Suitable polyols suited for forming the polyurethanes include aliphatic polyester polyols prepared from the reaction of ethylene or propylene oxides or mixtures thereof with a glycol; glycols such as ethylene glycol, propylene glycol, butylene glycol, tetramethylene glycol, hexamethylene glycol, and triols such as glycerol, trimethylolpropane, trishydroxymethylamino methane, and higher polyols such as pentaerythritol, sorbitol, castor oil, polyvinyl alcohol, sucrose, dextrose, methyl glycoside and the like; amino polyols made by the condensation of alkylene oxides and alkanol amines such as tetrahydroxyethylenediamine, tetrahydroxypropyl ethylene diamine; other organic compounds having an active hydrogen atom include amines such as triethanolamine, methylamine, diethanolamine, phenylenediamine, tolylenediamine, aminoethyl piperizine and the like.

The polyols also can be incorporated into a polymer and reacted with the isocyanates as in the case of polyesters. A polyester, as is known, is prepared by the reaction between a dicarboxylic acid and a glycol. Examples of conventional dicarboxylic acids suited for manufacuturing polyester polyols include succinic, glutaric, adipic, sebacic, phthallic, terephthallic, maleic, fumaric, itaconic, citraconic, and the like.

In the preparation of polyurethanes, conventional additives can be utilized for their desired effect without departing or detracting from the advantageous aspects of the catalysts of this invention. For example, blowing agents such as water or a volatile organic such as dichlorodifluoromethane, dichlorofluoromethane, trichloromonofluoromethane, dichlorofluoromethane, difluorodichloroethane, methylene chloride, carbontetrachloride, butane, pentane, and the like.

Foam stabilizers or surfactants are other additives which can be added for enhancing the retention of gas generated during the polymerization reaction and such stabilizers include silicone block polymers comprising polyalkylene glycol units, n-vinyl pyrrolidone, or n-vinyl pyrrolidone-dibutyl maleic copolymers or n-vinyl pyrrolidone-dibutyl maleate (vinyl acetate). Other examples are shown in U.S. Pat. No. 3,746,663.

In preparing the polyurethanes, the amine salt of an amino acid (DAC) is added to the organometallic catalyzed urethane composition in at least a sufficient or effective proportion for delaying the cure rate of the urethane. Generally from about 0.1 to about 5 parts by weight per 100 parts and preferably about 0.5 to about 1.5 per 100 parts by weight of reactive Zerewitinoff hydrogen compound, e.g. polyol are included. When less than about 0.1 parts are added to the composition, the DAC is not present in sufficient proportion to substantially influence the cure rate of the polyurethane. When more than about 3.5 parts amino acid are added to the urethane composition, no significant advantage in terms of increased cure rate are achieved and therefore for reasons of economy the catalyst concentration is preferably from about 0.5 to about 1.5 parts.

The organometallic catalyst component is included in polyurethane manufacture in a proportion of from about 0.005 to about 0.5, and preferably 0.01 to 0.2 parts by weight per 100 parts of active Zerewitinoff hydrogen compound. Variations within this broad range are practiced depending on whether, for example, high and low density polyurethanes are prepared and these variations are observed in practicing this invention. Generally, in high density polyurethanes from about 0.03 to about 0.07 parts organometalic, e.g. organo tin compound and in low density polyurethanes from about 0.08 to about 0.2 parts organometallic are used. Naturally, as the proportion of organometallic is increased in the urethane composition, the proportion amine salt of amino acid should be increased if one wants to substantially delay the urethane reaction or inhibit other adverse effects of the organometallic catalyst. However, the formulator can adjust the concentration of organometallic and amine salt of an amino acid as desired within the above ranges to achieve desired conditions for his line of products.

In visualizing the amine and the organometallic as a catalyst composition for urethane catalysis, approximately from about 0.1 to about 100 parts of the amine salts of amino acid are present per part of organometallic. Preferably, the catalyst composition comprises from about 2 to about 20 parts amine salts of an amino acid by weight per part organometallic. Thus, when the catalyst composition comprising the amine salt of an amino acid and organometallic is combined in suitable proportion for catalyzing a urethane reaction, both components are present in the desired range to achieve desired results. When less than about 0.5 parts of the amine salt of an amino acid are included per part of organometallic catalyst, then when the catalyst composition is added to the urethane composition, there generally is insufficient amine salt of an amino acid to counteract the catalyst activity of the organometallic or adverse effect of the organometallic if present in a high concentration. On the other hand, when the proportion of amine salt of an amino acid is increased above about 70 parts per part organometallic catalyst, there seems to be no significant enhancement of catalytic activity or of other desired features to warrant the additional expenditure and usage of the catalyst.

The following examples are provided to illustrate preferred embodiments in the invention and are not intended to restrict the scope thereof. All parts are parts by weight, all percentages are expressed as weight percentages, and all temperatures are in 0° C unless otherwise specified.

EXAMPLE 1

A difunctional acid, commonly known as hydroxyethyliminodiacetic acid (HEIDA), was prepared by first adding two mols monoethanolamine, six mols of sodium cyanide, and 1.1 mols of sodium hydroxide to 300 cc water contained in a vessel. Then, 486 cc of a 40% aqueous formaldehyde solution were slowly added to the aqueous solution of monoethanolamine and sodium cyanide with the addition of formaldehyde being controlled so that refluxing occurred during the addition. After all of the aqueous formaldehyde was added to the vessel, the mixture was refluxed for seven hours, cooled in an ice bath to a temperature of about 0° C, and then acidified to a pH of 1.5 with concentrated HCL. A precipitate was formed and this precipitate was isolated by filtration, dried and analyzed as hydroxyethyliminodiacetic acid.

EXAMPLE 2

Hydroxyethyliminodiproprionic acid was prepared by first forming hydroxyethyliminodiproprionitrile (HEIDPN) and then converting the nitrile to the diproprionic acid. The nitrile was formed by using the Michael's reaction where 1 mol of monoethanolamine was reacted with 1 mol of acrylonitrile at approximately 30° C for 8 hours.

Hydrolysis of the hydroxyethyliminodiproprionitrile to the acid was carried out by charging approximately 0.05 mols of the nitrile to a vessel and adding 20 to 30 cc's of water and 0.079 mols of barium hydroxide. The mixture was heated under constant agitation to a temperature of about 95° C and maintained at this temperature until gas evolution ceased. The mixture was cooled and then added to a boiling solution containing approximately 7.5 grams of concentrated sulfuric acid and 52 grams of water. This was done to precipitate the barium. The precipitate was removed by filtration and the filtrate concentrated to a thick syrup. Then, ethanol was added to the syrupy residue and a white precipitate formed. This precipitate was isolated by filtration, dried, and characterized as hydroxyethyliminodiproprionic acid. (HEIDPA).

EXAMPLE 3

A diethanolamine salt of Example I was prepared by reacting at room temperature (70° F) two mols of diethanolamine with one mol of HEIDA in dipropylene glycol. The quantity of diethanol amine and HEIDA was controlled in order to yield an end product containing approximately 50% by weight of the diethanolamine salt of HEIDA and 50% dipropylene glycol.

EXAMPLE 4

Bis-cyanoethyl glycine was prepared in conventional manner by reacting two mols acrylonitrile with one mol sodium salt of glycine in essentially the same manner used in preparing the catalyst of Example 2, except that the sodium salt was neutralized at the end of the reaction.

EXAMPLE 5

About 0.1 mol of hydroxyethylethylenediamine triacetic acid and 100 cc of methanol were charged to a beaker and stirred. Then about 80 grams or 45% choline were charged to the vessel and the contents stirred at a temperature of about 70° F for an hour. Vacuum was applied to the vessel and the contents heated to a temperature of 180° F. When all of the methanol was removed, the residue product was analyzed as the triquaternary ammonium carboxylate of hydroxyethylethylenediamine triacetic acid.

EXAMPLE 6

Conventional high density rigid polyurethane foams were prepared from the basic formulation below in conventional manner. In preparing these polyurethane foams, the catalyst, comprising an amine or tertiary amino acid (as indicated), and organometallic (as indicated) and the concentration of each catalyst component were varied to determine the overall effect on the foam formulation. The polyurethane foams were evaluated for cream time, gelation time, and cure time.

The components used for preparing the high density foam were as follows:

| Component | Amount, parts by weight |
|---|---|
| Mondur MR$^{200}$ Isocyanate | 100 |
| NIAX$^{200}$ DAS-361 Polyol | 65 |
| Thanol$^{200}$ G-400 Polyol | 27.7 |
| Polylite$^{200}$ 34-400 Polyol | 5.0 |
| Water | 0.6 |
| DC-193 (silicone surfactant) | 0.8 |
| Tertiary amino acid or nitrile catalyst parts/100 parts polyol (php) | 0.5 - 1.5 |
| Organometallic catalyst parts/100 parts polyol (php) | 0.005 - 0.5 |

(1) Mondur MR Isocyanate is crude 4,4'-methylene bisphenylisocyanate having an isocyanate equivalent of about 133, a functionality of about 2.7-2.9 and a viscosity of about 150-250 cps.

(2) NIAX DAS-361 Polyol is a sucrose/amine polyol having a hydroxyl number of 360.

(3) Thanol G-400 Polyol is a glycerol polyol having an hydroxyl number of 400.

(4) Polylite 34-400 Polyol is an amino polyol having a hydroxyl number of 790.

(5) In the examples to follow, TEDA refers to triethylenediamine; DMEA refers to dimethylethanolamine; TEA refers to triethylamine; DEA refers to diethanolamine; MEA refers to monoethanolamine; DEG refers to diethylene glycol; DPG refers to dipropylene glycol; DMF refers to dimethyl formamide; EG refers to ethylene glycol; PG refers to propylene glycol; T-12 refers to dibutyl tin dilaurate, php refers to the parts of catalyst (including solvent if used) per 100 parts polyol.

The results of the formulation testing is set forth in Tables 1 and 2.

TABLE 1

| | HIGH DENSITY RIGID FOAM | | | | |
|---|---|---|---|---|---|
| Catalyst php | Solvent | Orgamometallic php | Cream Time Sec. | Gel Time Sec. | Tack Free Cure Time Sec. |
| TEDA (0.23) | 67% PG | — | 31 | 73 | 104 |
| — | — | T-12 (0.03) | 46 | 82 | 94 |
| — | — | T-12 (0.04) | 44 | 78 | 87 |
| — | — | T-12 (0.05) | 33 | 61 | 68 |

TABLE 1-continued
HIGH DENSITY RIGID FOAM

| Catalyst php | Solvent | Orgamometallic php | Cream Time Sec. | Gel Time Sec. | Tack Free Cure Time Sec. |
|---|---|---|---|---|---|
| DMEA salt of Ex.1(0.5) | 67% EG-Acetonitrile | T-12 (0.03) | 67 | 103 | 128 |
| DMEA salt of Ex.1(1.0) | 67% EG-Acetonitrile | T-12 (0.03) | 68 | 108 | 132 |
| DMEA salt of Ex.1(0.5) | 67% EG-Acetonitrile | T-12 (0.04) | 60 | 87 | 96 |
| DMEA salt of Ex.1(1.0) | 67% EG-Acetonitrile | T-12 (0.04) | 62 | 90 | 101 |
| DMEA salt of Ex.1(0.5) | 67% EG-Acetonitrile | T-12 (0.05) | 52 | 73 | 80 |
| DMEA salt of Ex.1(1.0) | 67% EG EG-Acetonitrile | T-12 (0.05) | 54 | 78 | 88 |
| 27%Ex.1;73%HEIDPN(0.5) | | T-12 (0.03) | 61 | 86 | 94 |
| 27%Ex.1;73%HEIDPN(1.0) | | T-12 (0.04) | 62 | 85 | 99 |
| 27%Ex.1;73%HEIDPN(1.0) | | T-12 (0.05) | 59 | 82 | 90 |
| 27%Ex.1;73%HEIDPN(1.0) | | T-12 (0.03) | 64 | 90 | 104 |
| 27%Ex.1;73%HEIDPN(0.5) | | T-12 (0.04) | 60 | 81 | 96 |
| 27%Ex.1;73%HEIDPN(0.5) | | T-12 (0.05) | 56 | 78 | 86 |
| Ex. 3 (0.5) | 50% DPG | T-12 (0.03) | 73 | 98 | 112 |
| Ex. 3 (1.0) | 50% DPG | T-12 (0.03) | 75 | 104 | 116 |
| Ex. 3 (0.5) | 50% DPG | T-12 (0.04) | 63 | 85 | 94 |
| Ex. 3 (1.0) | 50% DPG | T-12 (0.04) | 64 | 89 | 99 |
| Ex. 3 (0.5) | 50% DPG | T-12 (0.05) | 61 | 81 | 89 |
| — | | T-12 (0.02) | 56 | 104 | 124 |
| Bis-cyanoethyl-glycine (0.5) | 70% ethylene glycol | T-12 (0.02) | 50 | 90 | 110 |
| Bis-cyanoethyl-glycine (1.0) | 70% ethylene glycol | T-12 (0.02) | 45 | 88 | 105 |
| Bis-cyanoethyl-glycine (2.0) | 70% ethylene glycol | T-12 (0.02) | 42 | 88 | 105 |
| Bis-cyanoethyl-glycine (0.5) | 70% ethylene glycol | — | 83 | 200 | 250 |

TABLE 2
HIGH DENSITY RIGID FOAM

| Catalyst php | Solvent | Organo-metallic php | Cream Time Sec. | Gel Time Sec. | Tack Free Cure Time Sec. |
|---|---|---|---|---|---|
| — | — | T-12 (0.1) | 27 | 43 | 47 |
| Bis-cyanoethyl-glycine (1.0) | 70% ethylene glycol | T-12 (0.1) | 23 | 38 | 45 |
| Bis-cyanoethyl-glycine (1.5) | 70% ethylene glycol | T-12 (0.1) | 25 | 44 | 54 |
| Bis-cyanoethyl-glycine (2.0) | 70% ethylene glycol | T-12 (0.1) | 24 | 43 | 49 |
| Bis-cyanoethyl-glycine (2.5) | 70% ethylene glycol | T-12 (0.1) | 23 | 45 | 52 |
| Ex. 1 (0.1) TEDA | 75% cyanoethyl diethanolamine | T-12 (0.15) | 62 | 115 | 144 |
| (0.1) TEDA | — | T-12 (0.15) | 53 | 97 | 120 |
| Ex. 1 (0.1) TEDA | 75% cyanoethyl diethanolamine | T-12 (0.15) | 53 | 95 | 112 |
| (0.1) TEDA | — | T-12 (0.02) | 46 | 82 | 100 |
| Ex. 1 (0.5) | 75% TEA | T-12 (0.04) | 40 | 70 | 82 |
| Ex. 1 (1.0) | 75% TEA | T-12 (0.04) | 39 | 68 | 80 |
| Mono TEDA salt of Ex. 1 (0.5) | 50% DEG | T-12 (0.06) | 43 | 65 | 70 |
| DMEA salt of Ex. 1 (0.5) | 59% DEG | T-12 (0.06) | 44 | 70 | 76 |
| bis TEDA salt of Ex. 1 (0.25) | 50% DEG | T-12 (0.05) | 33 | 63 | 68 |
| N-methyl diethanol-amine and Tri-n-propylamine salt of Ex. 1 (0.5) | 50% DPG | T-12 (0.05) | 56 | 92 | 104 |
| N-methyl diethanol-amine salt of Ex. 1 (0.75) | 50% DPG | T-12 (0.05) | 53 | 86 | 102 |
| tri-n-propylamine salt of Example 1 (0.5) | 50% DEG | T-12 (0.05) | 62 | 100 | 106 |
| tri-n-propylamine salt of Example 1 (0.25) | 50% DEG | T-12 (0.05) | 51 | 76 | 86 |
| tri-n-propylamine salt of Example 1 (0.5) | 50% diethylene glycol ethyl ether | T-12 (0.05) | 53 | 92 | 102 |
| Dimethylbenzyl amine salt of hydroxy-ethyl ethylene diamino triacetic acid (HEMP-OL) (0.5) | 50% diethylene glycol ethyl ether | T-12 (0.05) | 59 | 96 | 109 |
| Dimethylcyclohesyl-amine salt of imino diacetic acid (0.5) | 50% DEG | T-12 (0.05) | 31 | 54 | 62 |
| Dimethylcyclohexyl- | 50% DEG | T-12 (0.05) | 53 | 94 | 117 |

TABLE 2-continued

| Catalyst php | HIGH DENSITY RIGID FOAM | | | | |
|---|---|---|---|---|---|
| | Solvent | Organo-metallic php | Cream Time Sec. | Gel Time Sec. | Tack Free Cure Time Sec. |
| amine salt of ethylene-diamine tetraacetic acid (0.5) | | | | | |
| Dimethylcyclohexyl-amine salt of nitro-triacetic acid (0.5) | 50% DPC | T-12 (0.05) | 78 | 230 | 300 |
| N-ethyl morpholine salt of HEMP-OL (0.25) | 50% DEG | T-12 (0.05) | 62 | 89 | 97 |

EXAMPLE 7

Conventional low density rigid polyurethane foam formulations utilizing the components set forth below were prepared in conventional manner. In these polyurethane foams, the catalysts comprising an amino acid and organometallic and the concentration were varied. The basic formulation used for the low density rigid polyurethane foam was as follows:

| Component | Amount, parts |
|---|---|
| Hylene® TIC[1] | 105 |
| RS-6406 Polyol[2] | 109 |
| DC-193[3] Surfactant | 1.5 |
| R-11[4] Blowing Agent | 47 |

(1) Hylene TIC is an undistilled, technical grade of tolylene diisocyanate typically having an isocyanate content of 38.75 to 39.75% an amine equivalent of 105.5 to 108 and a viscosity at 25° C of 15 to 75 cps.

(2) RS-6406-Polyol is a sucrose/amine polyol having a hydroxyl number 475.

(3) DC-193 Surfactants are polysiloxane polyoxyalkylene block copolymers. Examples are shown in U.S. Pat. Nos. 2,834,748 and 2,917,480.

(4) R-11 Blowing Agent is trichloromonofluoromethane.

(5) See the excerpt for high density formulations for an explanation of terms used on page 20, paragraph (5). The results are shown in Table 3.

TABLE 3

| Catalyst php | LOW DENSITY RIGID FOAM | | | | | | |
|---|---|---|---|---|---|---|---|
| | Solvent | Organometallic php | Cream Time Sec. | Gel Time Sec. | Tack Free Cure Time Sec. | Shrinkage | Friability |
| dimethylcyclo-hexylamine (0.8) | — | — | 18 | 77 | 168 | none | none |
| TEDA (0.17) | 67% DPG | — | 30 | 106 | 164 | slight | moderate |
| TEDA (0.43) | 67% DPG | — | 11 | 50 | 75 | none | none |
| — | — | T-12 (0.2) | 38 | 70 | 98 | moderate | moderate |

TABLE 4

| Catalyst php | LOW DENSITY RIGID FOAM | | | | | | |
|---|---|---|---|---|---|---|---|
| | Solvent | Organometallic php | Cream Time Sec. | Gel Time Sec. | Tack Free Cure Time Sec. | Shrinkage | Friability |
| Ex. 3 (0.5) | 50% DPG | T-12 (0.08) | 45 | 142 | 209 | moderate-severe | moderate-severe |
| Ex. 3 (1.0) | 50% DPG | T-12 (0.2) | 38 | 90 | 118 | slight | slight-moderate |
| Ex. 3 (1.0) | 50% DPG | T-12 (0.08) | 47 | 156 | 219 | moderate-severe | moderate-severe |
| Ex. 3 (0.5) | 50% DPG | T-12 (0.1) | 46 | 131 | 186 | " | " |
| Ex. 3 (1.0) | 50% DPG | T-12 (0.1) | 48 | 135 | 193 | severe | severe |
| Ex. 3 (1.0) | 50% DPG | T-12 (0.2) | 38 | 90 | 118 | slight | slight-moderate |
| Ex. 3 (1.5) | 50% DPG | T-12 (0.3) | 31 | 70 | 93 | very slight | slight-moderate |
| N-methyl-diethanolamine salt bis-cyano-ethyl glycine (0.5) | 50% DEG | T-12 (0.08) | 20 | 87 | 128 | slight | slight |
| "(0.5) | " | T-12 (0.2) | 22 | 61 | 115 | slight-moderate | slight |
| "(1.0) | " | T-12 (0.2) | 21 | 56 | 92 | severe | moderate |
| MEA salt of HEIDA (0.5) | 67% EG-Acetonitrile | T-12 (0.08) | 45 | 134 | 185 | moderate | slight |
| MEA salt of HEIDA (0.5) | " | T-12 (0.1) | 43 | 127 | 173 | slight-moderate | slight |
| MEA salt of HEIDA (1.0) | " | T-12 (0.1) | 40 | 123 | 170 | slight-moderate | slight |

The results for both high density and low density foams show that the amine salts of amino acids of this invention have the ability to tie an organometallic, e.g. dibutyl tin dilaurate and delay the cream time substantially, and yet in many cases produce a tack free polyurethane in about the same time as when the organometallic is used alone. Although in the manufacture of low density foams there is a tendency to produce a friable product having some shrinkage, the ratios of DAC to organometallic of tin can be adjusted as deomonstrated to alleviate these problems. However, cream and gelation times are extended in most formulations.

What is claimed is:

1. In a process for the production of a urethane composition by polymerizing an organic polyisocyanate, an organic compound having an active hydrogen atom, and an organometallic catalyst, the improvement which comprises using an effective proportion of a catalyst comprising an organometallic catalyst and an amine salt of an amino acid selected from the group represented by the formulas:

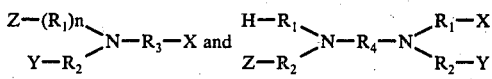

wherein
$R_1$, $R_2$ and $R_3$ independently are alkylene groups having from 1 to 15 carbon atoms, cycloalkyl groups, phenyl groups and phenyl alkyl groups with the alkyl portion having from 1 to 6 carbon atoms; and
$R_4$ is an alkylene radical having from 1 to 4 carbon atoms;
X is an amine salt of a carboxylic acid group;
Y is a hydrogen atom, a hydroxyl group, a carboxylic acid group, a nitrile group, or an amine salt of a carboxylic acid group;
Z is a hydrogen atom, a hydroxyl group, a carboxylic acid group, a nitrile group, or an amine salt of a carboxylic acid group; and
$n$ is 0 or 1;
with the proviso that when X, Y, or Z is an amine salt of a carboxylic acid group, the carboxyl moiety is the linkage bonding the X, Y, or Z radical to the residue of the amine salt of formula I or II.

2. The process of claim 1 wherein from about 0.1 to 5.0 parts by weight of the amine salt of an amino acid is included per 100 parts organic compound.

3. The process of claim 1 wherein the organic compound is a polyol.

4. The process of claim 1 wherein the organometallic catalyst is a organo tin compound.

5. The process of claim 4 wherein the organo portion of the organo tin compound is aliphatic.

6. The process of claim 1 wherein the amine salt of the amino acid is represented by Formula I.

7. The process of claim 6 wherein $R_1$, and $R_3$ are alkylene groups, and $n$ is 1.

8. The process of claim 7 wherein $R_1$ and $R_2$ have from about 1 to 6 carbon atoms.

9. The process of claim 8 wherein $R_3$ is an alkylene group having from 1 to 3 carbon atoms.

10. The process of claim 9 wherein X is a tertiary amine salt of a carboxylic acid.

11. The process of claim 10 wherein Z is a hydroxyl group.

12. The process of claim 10 wherein Y is a tertiary amine salt of a carboxylic acid.

13. The process of claim 12 wherein Z is a hydroxyl group.

14. The process of claim 13 wherein X and Y are triethylene diamine salts of carboxylic acids.

15. In a process for the production of a urethane composition by polymerizing an organic polyisocyanate, an organic compound having an active hydrogen atom, an organometallic catalyst, the improvement which comprises using an effective proportion of a catalyst comprising an organometallic catalyst and an amine salt of an amino acid produced by the reaction of
(a) an amine selected from the group consisting of ammonia, a primary, and a secondary amine, and
(b) a reactant selected from the group consisting of (i) an olefinic reactant having sufficient reactivity for displacing an amine hydrogen atom and having at least monoacid functionality or functionality convertible to the acid form, and (ii) a halogenated organic acid having sufficient reactivity to react with an amine hydrogen or having functionality convertible to the acid form; and wherein any said functionality is subsequently converted to the acid form prior to the formation of the amine salt.

16. The process of claim 15 which includes from about 0.1 to 5 parts of the amine salt per 100 parts organic compound.

17. The process of claim 15 wherein the organic compound is a polyol.

18. The process of claim 15 wherein the organometallic catalyst is an organo tin compound.

19. The process of claim 15 wherein the reactant (b) is an olefinic compound and is selected from the group consisting of an unsaturated acid, an unsaturated nitrile, an unsaturated ketone and an unsaturated ester.

20. The process of claim 15 wherein amine (a) is selected from the group consisting of hydroxy-alkyl, and alkyl primary and secondary amines.

21. The process of claim 20 wherein the alkyl portion of the amine (a) has from 2 to 4 carbon atoms.

22. The process of claim 109 wherein the amine (a) is a primary amine, and 19 mols olefinic reactant are reacted per mol of amine.

23. The process of claim 22 wherein the olefinic reactant (b) is selected from the group consisting of acrylonitrile, acrylic acid, methyl vinyl ketone and substituted derivatives thereof.

24. The process of claim 15 wherein the catalyst component is a tertiary amine salt of amino acid.

25. In a process for the production of a urethane composition by polymerizing an organic polyisocyanate using an effective amount of a catalyst comprising an organometallic catalyst and an organic compound having an active hydrogen atom, and an organometallic catalyst, the improvement as a catalyst component which comprises the amine salt of an amino acid produced by reacting an amine (a) selected from the group consisting of ammonia, a primary and a secondary amine, with an aldehyde (b) and with a cyanide (c) to form a nitrile wherein at least one of the nitrile groups in the reaction product is subsequently converted to an acid prior to formation to the amine salt.

26. The process of claim 25 wherein the amine (a) is a primary amine.

27. The process of claim 26 wherein the primary amine (a) is selected from the group consisting of hydroxyalkyl and alkyl amines with the alkyl portion having from 2 to 4 carbon atoms.

28. The process of claim 27 wherein the aldehyde (b) is formaldehyde and the amine salt is a tertiary amine salt.

* * * * *